(12) United States Patent
Lee et al.

(10) Patent No.: US 9,016,311 B2
(45) Date of Patent: Apr. 28, 2015

(54) FLOW PASSAGE NETWORK

(71) Applicant: Postech Academy-Industry Foundation, Pohang (KR)

(72) Inventors: Sang-Joon Lee, Pohang (KR); Jung-Yeop Lee, Pohang (KR)

(73) Assignee: Postech Academy-Industry Foundation, Pohang (KR)

( * ) Notice: Subject to any disclaimer, the term of this patent is extended or adjusted under 35 U.S.C. 154(b) by 0 days.

(21) Appl. No.: 14/106,342

(22) Filed: Dec. 13, 2013

(65) Prior Publication Data

US 2014/0096851 A1   Apr. 10, 2014

Related U.S. Application Data

(63) Continuation of application No. 12/944,470, filed on Nov. 11, 2010, now Pat. No. 8,640,734.

(30) Foreign Application Priority Data

Nov. 12, 2009   (KR) .................. 10-2009-0109301

(51) Int. Cl.
*F16L 41/02* (2006.01)
*F16L 25/14* (2006.01)

(52) U.S. Cl.
CPC ............... *F16L 41/023* (2013.01); *F16L 25/14* (2013.01); *F16L 41/02* (2013.01)

(58) Field of Classification Search
CPC .................................. F16L 41/023; F16L 25/14
USPC ........................... 137/561 A, 833; 285/131.1
See application file for complete search history.

(56) References Cited

U.S. PATENT DOCUMENTS

| | | | |
|---|---|---|---|
| 3,381,336 A | 5/1968 | Wells | |
| 3,825,645 A | 7/1974 | Fayet | |
| 6,027,146 A * | 2/2000 | Kurimoto | ................... 285/131.1 |
| 6,156,273 A | 12/2000 | Regnier et al. | |
| 7,896,261 B2 * | 3/2011 | Holmes | ......................... 239/565 |
| 2005/0212287 A1 * | 9/2005 | Caro | .......................... 285/125.1 |
| 2009/0194993 A1 * | 8/2009 | Tong | ......................... 285/131.1 |

FOREIGN PATENT DOCUMENTS

| | | |
|---|---|---|
| JP | 59-164891 | 4/1983 |
| JP | 5-149437 A | 6/1993 |
| JP | 2007-255624 A | 10/2007 |

* cited by examiner

*Primary Examiner* — Atif Chaudry
(74) *Attorney, Agent, or Firm* — Marshall, Gerstein & Borun LLP

(57) ABSTRACT

An exemplary embodiment of the present invention relates to a manufacturing method of a flow passage network and a flow passage network for minimizing energy loss occurring during fluid flow, and there are effects in which flow loss is reduced during fluid transport and the energy efficiency of flow passages increases by optimizing geometric factors of flow passages on the basis of biomimetic techniques and theoretical formulae of fluid mechanics. Further, it is effective in manufacturing microfluidics in which laminar flow with a low Reynolds number is dominant.

5 Claims, 5 Drawing Sheets

FLOW PASSAGE NETWORK

CROSS-REFERENCE TO RELATED APPLICATION

This is a continuation application of U.S. Ser. No. 12/944,470 filed Nov. 11, 2010, which claims priority and the benefit of Korean Patent Application No. 10-2009-0109301 filed in the Korean Intellectual Property Office on Nov. 12, 2009, the entire contents of which are incorporated herein by reference.

BACKGROUND OF THE INVENTION (a) Field of the Invention

The present invention relates to a manufacturing method of a flow passage network and a flow passage network using the same, and more particularly, to a manufacturing method of a flow passage network and a flow passage network for minimizing energy loss occurring during fluid flow.

(b) Description of the Related Art

Fluid flow systems have been developed throughout the history of mankind over a long period of time. For example, there are agricultural irrigation canals, urban water and sewage passages, transport passage systems of industrial estates, etc. Further, small-scale bio-chips and blood circulation systems of human bodies can also be complex forms of flow passage networks.

Existing flow passages for transporting fluids have been manufactured while emphasizing a proper function of "fluid transport", and during manufacturing thereof, factors such as materials, spatial limits, processing techniques, and transport distances rather than geometric factors for network organization or branching of flow passages have been considered as important elements.

Particularly, even given that manufacturing microchannel networks corresponding to flow passages of various bio-chips, DNA chips, micro-mixers, and μ-TAS (total analysis systems) having been spotlighted recently, optimization based on a viewpoint of a geometric factor or transport energy has been ignored. In this case, much flow loss occurs due to inefficiency of fluid transport.

Further, such flow passages cause an abnormal flow phenomenon such as flow separation and secondary flow due to inappropriate geometric factors, thereby making smooth flow difficult and increasing flow loss.

Most of all, in view of an entire flow passage system, flow loss causes a great deal of energy loss. Therefore, a geometrically manufacturing method for improving an inefficient flow passage system is necessary.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a manufacturing method of a flow passage network and a flow passage network using the same having advantages of minimizing energy loss occurring during flow.

An exemplary embodiment of the present invention provides a manufacturing method of a flow passage network including a flow passage in which a mother vessel having a radius of $\alpha_0$ and a first branch and a second branch bifurcated from the mother vessel and having radiuses of $\alpha_1$ and $\alpha_2$, respectively, the method including: a first step of setting a diameter $D_0$ of the mother vessel to 1 and setting a bifurcation angle $\theta_1$ of the first branch to a predetermined value; a second step of calculating a diameter $D_1$ of the first branch by substituting the diameter $D_0$ of the mother vessel and a bifurcation angle $\theta_1$ of the first branch set in the first step into $$\cos\theta_1 = \frac{a_0^4 + a_1^4 - (a_0^3 - a_1^3)^{4/3}}{2a_0^2 a_1^2};$$

a third step of calculating a diameter $D_2$ of the second branch by substituting the diameter $D_0$ of the mother vessel and the diameter $D_1$ of the first branch calculated in the second step into $D_0^3 = D_1^3 + D_2^3$; a fourth step of calculating a bifurcation angle $\theta_2$ of the second branch by substituting the diameter $D_0$ of the mother vessel and the diameter $D_2$ of the second branch calculated in the third step into $$\cos\theta_2 = \frac{a_0^4 - (a_0^3 - a_2^3)^{4/3} + a_2^4}{2a_0^2 a_2^2};$$

and a fifth step of checking whether the diameters $D_0$, $D_1$, and $D_2$ and the bifurcation angles $\theta_1$, $\theta_2$, and $\theta_{1+2}$ have been calculated to have correct values by using $$\cos(\theta_{1+2}) = \frac{(a_1^3 + a_2^3)^{4/3} - a_1^4 - a_2^4}{2a_1^2 a_2^2}.$$

The manufacturing method of a flow passage network according to the exemplary embodiment of the present invention may further include a sixth step of determining whether any one of the first branch and the second branch is bifurcated, returning to the first step in order to determine geometric factors of the next branches when any one of the first branch and the second branch is branched, and finishing when any one of the first branch and the second branch is not bifurcated.

The manufacturing method of a flow passage network according to the exemplary embodiment of the present invention may further include a seventh step of calculating a global flow resistance $P_{total}$ the flow passage network by adding a of manufacture condition regarding the diameters and lengths of the branches by using $$P_{total} = \sum_{i=0}^{n} \Delta p_i = \frac{128\nu}{\pi} \dot{m} \sum_{i=0}^{n} \frac{L_i}{D_i^4}$$

after the sixth step.

Another exemplary embodiment of the present invention provides a flow passage network using the manufacturing method of a flow passage network.

The branches may be symmetric bifurcations having the same diameter.

The branches may have a bifurcation angle range of 37.5°±2° with respect to the mother vessel, respectively.

The diameters and lengths of the mother vessel and the branches may decrease at a ratio of $2^{-1/3}$.

As described above, according to the exemplary embodiments of the present invention, there are effects in which flow loss is reduced during fluid transport and the energy efficiency of flow passages increases by optimizing geometric factors of flow passages on the basis of biomimetic techniques and theoretical formulae of fluid mechanics. Further, it is effective in manufacturing microfluidics in which laminar flow with a low Reynolds number is dominant.

DETAILED DESCRIPTION OF THE EMBODIMENTS

Figure 1:
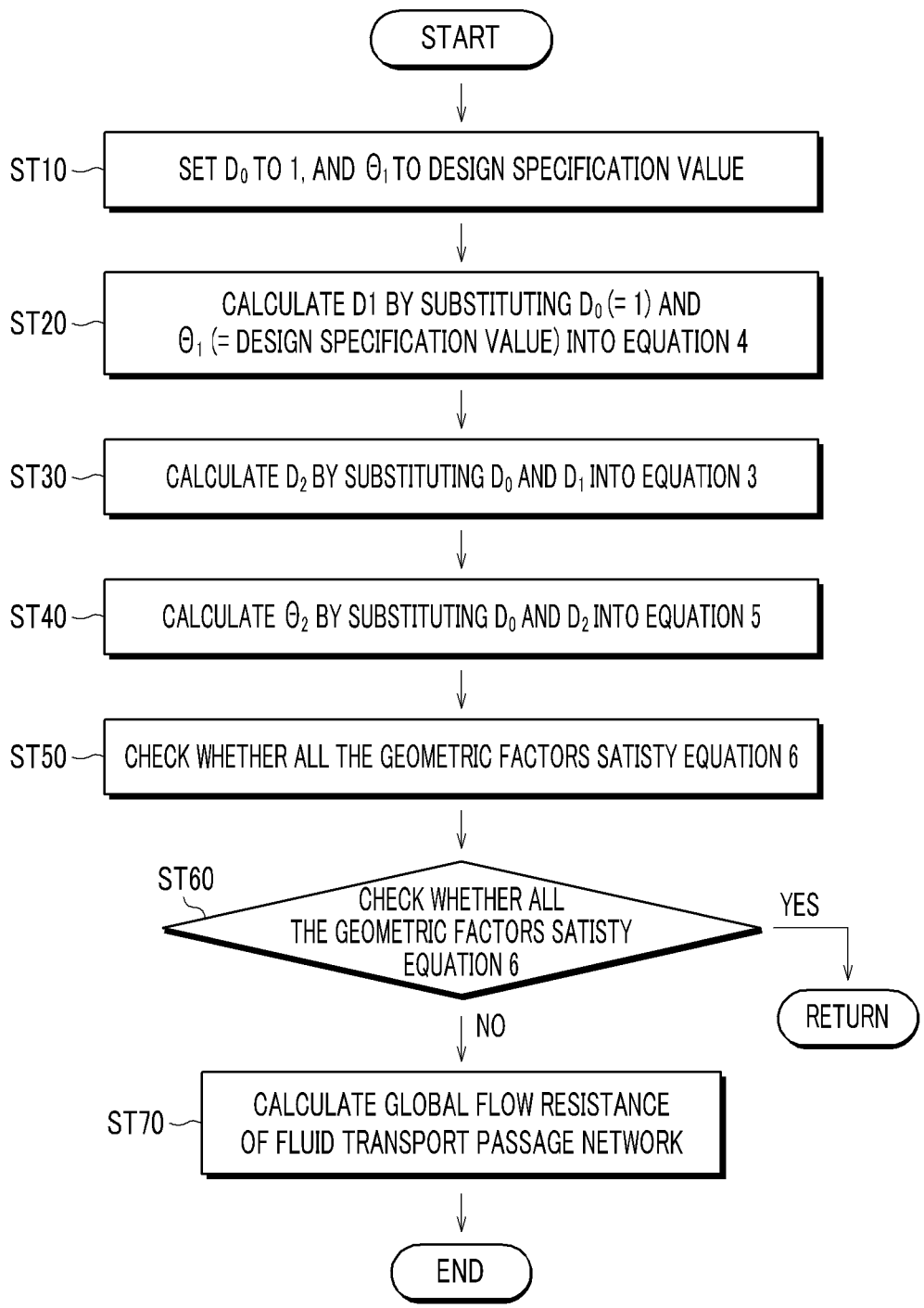
FIG. 1 shows a flowchart of a manufacturing method of a flow passage network according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
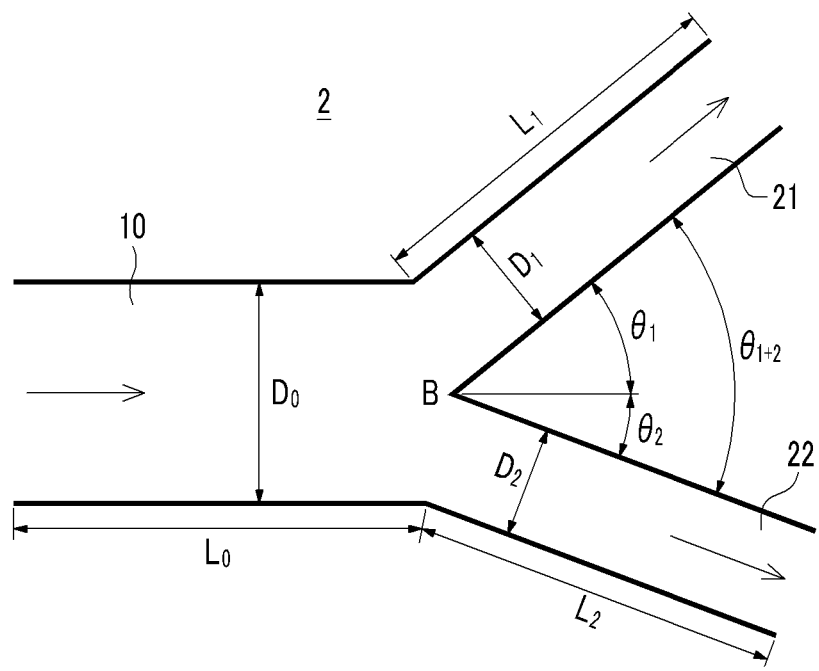
FIG. 2 shows a schematic diagram of a branched passage applied to a flow passage network manufactured according to an exemplary embodiment of the present invention.

FIG. 1 shows a flowchart of a manufacturing method of a flow passage network (hereinafter referred to as "a manufacturing method" for convenience) according to an exemplary embodiment of the present invention, and FIG. 2 shows a schematic diagram of bifurcated branches applied to a flow passage network manufactured according to an exemplary embodiment of the present invention.

Referring to FIGS. 1 and 2, an exemplary embodiment shows a method of optimizing geometric factors upon which a first branch 21 and a second branch 22 are bifurcated from a mother vessel 10, and exemplarily shows the individual lengths $L_0$, $L_1$, and $L_2$, diameters $D_0$, $D_1$, and $D_2$, and bifurcation angles $\theta_1$, $\theta_2$, and $\theta_{1+2}$ of the mother vessel 10, the first branch 21, and the second branch 22, in order to minimize flow loss occurring in a flow passage 2.

As shown in FIG. 2, the flow passage 2 may be configured in a single bifurcation form in which the first branch 21 and the second branch 22 are bifurcated from the mother vessel 10, or may be configured in forms of flow passage networks 4 and 6 (see FIGS. 4 and 5) by combining single bifurcations if necessary. Therefore, the manufacturing method according to the present exemplary embodiment is not limited to determining geometric factors in the flow passage 2 of a single bifurcation, but also includes determining geometric factors in the flow passage networks 4 and 6.

Referring to FIG. 2, the length $L_0$ is set between one end of the mother vessel 10 and a bifurcated point B, the length $L_1$ is set between the bifurcated point B and an end of the first branch 21, and the length $L_2$ is set between the bifurcated point B and an end of the second branch 22. The diameters $D_0$, $D_1$, and $D_2$ are set in the mother vessel 10, the first branch 21, and the second branch 22, respectively. The bifurcation angle $\theta_1$ is set between an extended center line of the mother vessel 10 and the first branch 21, the bifurcation angle $\theta_2$ is set between an extended center line of the mother vessel 10 and the second branch 22, and the bifurcation angle $\theta_{1+2}$ is set between the first branch 21 and the second branch 22.

The manufacturing method according to the present exemplary embodiment has been developed on the basis of observation of microcirculation systems of human bodies and hydrodynamic theoretical formulae.

Figure 3:
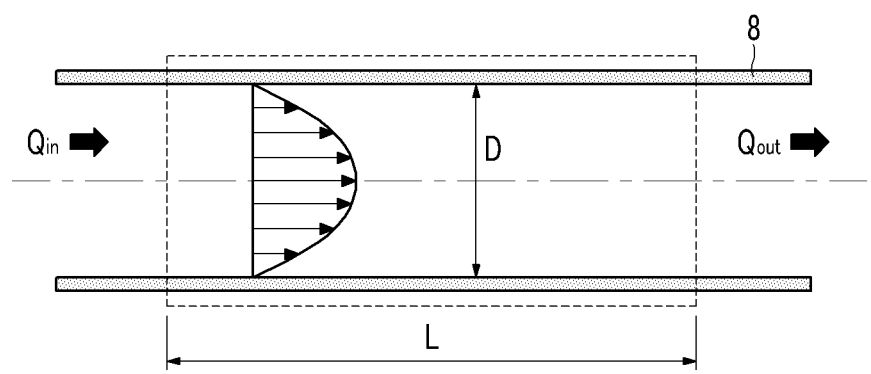
FIG. 3 shows a schematic diagram of fluid flow inside a circular tube.

FIG. 3 shows a schematic diagram of fluid flow inside a circular tube. Referring to FIG. 3, when flow in a circular tube 8 has a laminar flow characteristic, the Hagen-Poiseuille flow, a pressure drop $\Delta p$, and wall-face shearing stress $\tau_w$ are the same as in Equation 1, and a flow rate Q (=inflow rate $Q_{in}$=outflow rate $Q_{out}$) is the same as in Equation 2.

$$\Delta p = \frac{4L\tau_w}{D} \qquad \text{[Equation 1]}$$

$$Q = \frac{\pi D^4 \Delta p}{128\,\mu L} \left( \text{or } \Delta p = \frac{128\,\mu L}{\pi D^4} Q \right) \qquad \text{[Equation 2]}$$

Here, D is the diameter of the circular tube 8, L is the length of the circular tube 8, and μ is a viscosity coefficient of a fluid.

Meanwhile, according to Murray's law derived by a minimum work principle, in order to minimize flow energy loss of a fluid flowing from the mother vessel 10 to the first branch 21 and the second branch 22 (see FIG. 2), the relationship as in Equation 3 should be established.

$$D_0^3 = D_1^3 + D_2^3 \qquad \text{[Equation 3]}$$

Further, in order to minimize the flow energy loss, the relationships as in Equations 4 to 6 between optimal bifurcation angles $\theta_1$, $\theta_2$, and $\theta_{1+2}$ and the diameters $D_0$, $D_1$, and $D_2$ of the mother vessel 10 and the first and second branches 21 and 22 are established. Since a is the radius of the passage, the relationship of D=2α is established. That is, the relationships of $\alpha_0 = D_0/2$, $\alpha_1 = D_1/2$, and $\alpha_2 = D_2/2$ are established.

$$\cos\theta_1 = \frac{a_0^4 + a_1^4 - (a_0^3 - a_1^3)^{4/3}}{2 a_0^2 a_1^2} \qquad \text{[Equation 4]}$$

$$\cos\theta_2 = \frac{a_0^4 - (a_0^3 - a_2^3)^{4/3} + a_2^4}{2 a_0^2 a_2^2} \qquad \text{[Equation 5]}$$

$$\cos(\theta_{1+2}) = \frac{(a_1^3 + a_2^3)^{4/3} - a_1^4 - a_2^4}{2 a_1^2 a_2^2} \qquad \text{[Equation 6]}$$

It is possible to optimize the flow passage 2 composed of the single bifurcation of the mother vessel 10 and the first and second branches 21 and 22 through the relational equations between the geometric factors, that is, Equations 3 to 6, and it is possible to optimize the entire flow passage networks 4 and 6 composed of a combination of such optimized signal bifurcations.

In general, Murray's law relates to a minimizing energy required for fluid flow. It is known that the mother vessel 10 and the first and second branches 21 and 22 manufactured on the basis of Murray's law minimize flow disturbances at the bifurcated point B (see FIG. 2). Particularly, an exponent 3 seen in Murray's law has a low loss coefficient with respect to diameter ratio of almost all branches.

The manufacturing method of the flow passage 2 according to an exemplary embodiment may be implemented as a manufacturing process shown in FIG. 1. The manufacturing method of an exemplary embodiment includes a first step ST10, a second step ST20, a third step ST30, a fourth step ST40, a fifth step ST50, and a sixth step ST60.

The first step ST10 sets the diameter $D_0$ of the mother vessel 10 to 1, and sets the bifurcation angel $\theta_1$ of the first branch 21 to a predetermined value that is a known design specification value.

The second step ST20 calculates the diameter $D_1$ of the first branch 21 by substituting the diameter $D_0$ of the mother vessel 10 and the bifurcation angle $\theta_1$ of the first branch 21 set in the first step ST10 into Equation 4.

The third step ST30 calculates the diameter $D_2$ of the second branch 22 by substituting the diameter $D_0$ of the mother vessel 10 and the diameter $D_1$ of the first branch 21 calculated in the second step ST20 into Equation 3.

The fourth step ST40 calculates the bifurcation angle $\theta_2$ of the second branch 22 by substituting the diameter $D_0$ of the mother vessel 10 and the diameter $D_2$ of the second branch 22 calculated in the third step ST30 into Equation 5.

The fifth step ST50 checks whether all the geometric factors $D_0$, $D_1$, $D_2$, $\theta_1$, $\theta_2$, and $\theta_{1+2}$ having been calculated in the first, second, third, and fourth steps ST10, ST20, ST30, and ST40 have correct values by using Equation 6.

The sixth step ST60 determines whether a next bifurcated stage is in the first or second branch 21 or 22. When the first or second branch 21 or 22 is bifurcated, the process returns to the first step ST10 to calculate geometric factors of the next branches. When the first and second branches 21 and 22 are not bifurcated, the process finishes. When the first or second branch 21 or 22 is bifurcated, the first or second branch 21 or 22 becomes a mother vessel and the next branches become first and second branches.

It is possible to manufacture the mother vessel 10 and the first and second branches 21 and 22 with desired design specification values through the first to sixth steps ST10 to ST60, and it is possible to optimize the entire flow passage networks 4 and 6 composed of a combination of bifurcated branches by performing calculations with respect to the next branches (not shown) bifurcated from the first or second branch 21 or 22 by repeating the same process.

The manufacturing method according to the exemplary embodiment exemplifies a method of calculating the other geometric factors $D_1$, $D_2$, $\theta_2$, and $\theta_{1+2}$ from the diameter $D_0$ of the mother vessel 10 and the bifurcation angle $\theta_1$ of the first branch 21. Further, even though not shown, it is possible to calculate the other geometric factors $D_2$, $\theta_1$, $\theta_2$, and $\theta_{1+2}$ from the diameter $D_0$ of the mother vessel 10 and the diameter $D_1$ of the first branch 21, and it is possible to calculate the other geometric factors $D_1$, $\theta_1$, $\theta_2$, and $\theta_{1+2}$ from the diameter $D_0$ of the mother vessel 10 and the diameter $D_2$ of the second branch 22.

In order to verify Equations 3 to 6 and obtain information of the geometric factors actually used during manufacturing of the flow passage 2, the results in Table 1 (measured values of geometric factors of circulation systems) were obtained by performing measurement with respect to circulation systems of living bodies.

TABLE 1

| Bifurcation Factor | Measured Value |
| --- | --- |
| Cross-sectional area ratio $\gamma$ $(=(D_1^2 + D_2^2)/D_0^2)$ | 1.209 |
| Ratio of Murray's law $\alpha$ $(=D_0^3/(D_1^3 + D_2^3))$ | 1.053 |
| $D_1/D_0$ | 0.786 |
| $D_2/D_1$ | 1.001 |
| $D_2/D_0$ | 0.743 |
| Bifurcation angle of First Branch $\theta_1$, (°) | 37.434 |
| Bifurcation angle of Second Branch $\theta_2$, (°) | 39.726 |
| Bifurcation angle $\theta_{1+2}$, (°) | 77.161 |

In Table 1, the ratio $D_2/D_1$ of the diameters $D_1$ and $D_2$ of the first and second branches 21 and 22 is 1.001, which means that almost all branches existing in a circulation system of a living body have the symmetric bifurcation ($D_1=D_2$) pattern.

If a calculation is performed by substituting $D_1=D_2$ into Equations 3 to 6 on the basis of the measured results, it can be seen that the measured values shown in Table 1 are very similar to the theoretical values ($D_1/D_0=D_2/D_0=2^{-1/3}\approx 0.794$, $\gamma=2^{1/3}\approx 1.260$, $\theta_1=\theta_2=37.5°$) of the geometric factors of the symmetric branch system.

The manufacturing method of the first to sixth steps ST10 to ST60 is effective as manufacturing guidelines of each of the first and second branches 21 and 22. However, in order to manufacture the configuration of the entire flow passage network 4 or 6, manufacture conditions of the diameters $D_1$ and $D_2$ and lengths $L_1$ and $L_2$ of the first and second branches 21 and 22 are additionally required.

Therefore, the manufacturing method of an exemplary embodiment may further include a seventh step ST70. The seventh step ST70 optimizes the global flow resistance of the flow passage network 4 that is sequentially bifurcated.

Figure 4:
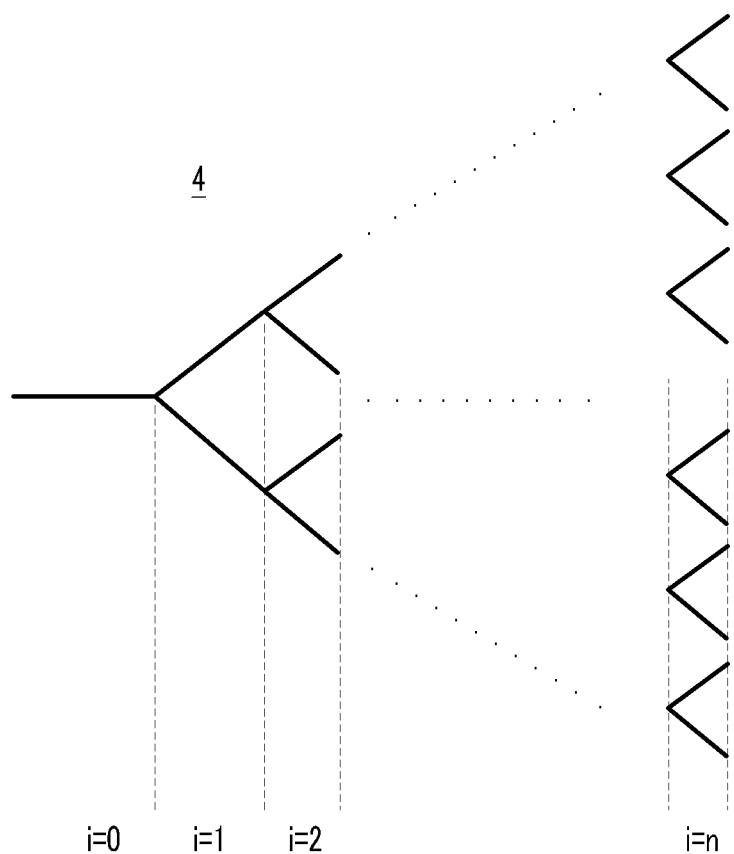
FIG. 4 shows a schematic diagram of a flow passage network composed of a combination of branched passages.

FIG. 4 shows a schematic diagram of a flow passage network composed of a combination of bifurcated branches. Referring to FIG. 4, additional manufacturing conditions of the flow passage network 4 are derived through optimization of the global flow resistance of the flow passage network 4 that is sequentially bifurcated as shown in FIG. 4.

The global flow resistance $P_{total}$ the flow passage network 4 shown in of FIG. 4 is the same as in Equation 7.

$$P_{total} = \sum_{i=0}^{n} \Delta p_i = \frac{128\nu}{\pi}\dot{m}\sum_{i=0}^{n}\frac{L_i}{D_i^4} \qquad \text{[Equation 7]}$$

Here, $\nu$ and $\dot{m}$ represent the kinematic viscosity coefficient and a mass flow rate, respectively, and i represents a bifurcation generation number.

A resistance factor which is an important geometric factor having a great effect on the global flow resistance $P_{total}$ can be considered as $L/D^4$ represented by a ratio of a length L and a diameter D. A manufacturing condition of the length L and the diameter D which are geometric factors constituting the resistance factor is obtained as follows. First, in a case of symmetric bifurcation ($D_1=D_2$), Murray's law of Equation 3 is the same as in Equation 8.

$$D_i^3 = 2D_{i-1}^3 (\text{or } D_{i-1}^3 = 2D_i^3) \qquad \text{[Equation 8]}$$

A volume $V_i$ of a branch in each bifurcation generation of FIG. 4 is expressed as Equation 9.

$$V_i = \frac{2^i \pi D_i^2}{4} L_i \qquad \text{[Equation 9]}$$
$$i = 0, 1, \ldots, n$$

If a condition in which volumes of branches in each bifurcation generation i are the same ($V_i$ is constant) is applied to Equation 9, the manufacturing condition of the diameter D and length L of a branch is determined.

$$V_i = \frac{2^i \pi D_i^2}{4} L_i \Rightarrow 2^i D_i^2 L_i = c$$

-continued $$\frac{2^{i+1}D_{i+1}^2 L_{i+1}}{2^i D_i^2 L_i} = 1$$

Here, since $$\frac{2^{i+1}}{2^i} = 2$$

and $$\left(\frac{D_{i+1}}{D_i}\right)^2 = 2^{-\frac{2}{3}}$$

(see Equation 8) are satisfied, $$\left(\frac{L_{i+1}}{L_i}\right) = 2^{-\frac{1}{3}}$$

is satisfied. That is, a reduction ratio of the diameter D and the length L is the same as in Equation 10.

$$\left(\frac{D_{i+1}}{D_i}\right) = 2^{-\frac{1}{3}} = 0.7937 \quad \text{[Equation 10]}$$

or $$\left(\frac{L_{i+1}}{L_i}\right) = 2^{-\frac{1}{3}} = 0.7937$$

As the generation number increases in the flow passage network 4, it is possible to minimize loss caused by the flow resistance, if the length L and the diameter D are reduced at a ratio of $2^{-1/3}$, that is, by about 20.63%.

Figure 5:
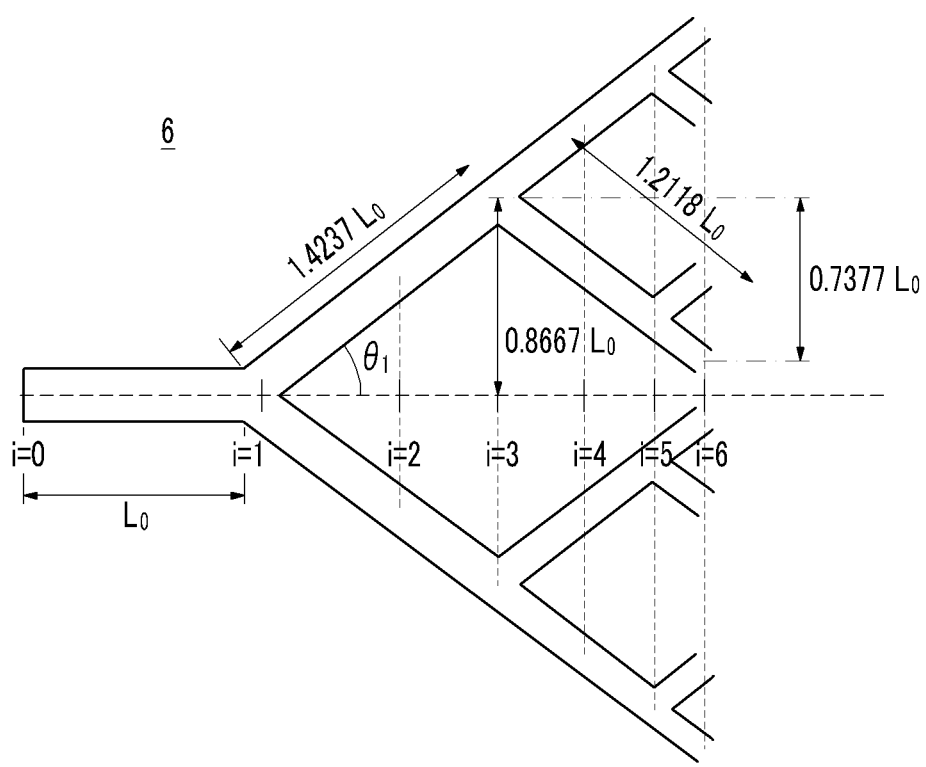
FIG. 5 shows a schematic diagram of a flow passage network using the manufacturing method of FIG. 1.

FIG. 5 shows a schematic diagram illustrating a flow passage network using the manufacturing method of FIG. 1. Referring to FIG. 5, a flow passage network 6 manufactured by applying the manufacturing method of an exemplary embodiment is illustrated.

Since the flow passage network 6 that is optimally manufactured optimizes individual branches and the entire flow passage 6 through Equations 1 to 10, it is possible to minimize flow loss.

Further, even though the description has been made in an exemplary embodiment by exemplifying the flow passage network in which the mother vessel and the branches are formed to have a circular cross-section, the exemplary embodiment can be applied in the same way to a flow passage network configured to have a rectangular cross-section.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 2: Flow passage | 4, 6: Flow passage network |
| 8: Circular tube | 10: mother vessel |
| 21, 22: first and second branch | B: Branched point |
| $D_0, D_1, D_2$: Diameter | $L_0, L_1, L_2$: Length |
| $\theta_1, \theta_2, \theta_{1+2}$: Bifurcation angle | |

What is claimed is:

1. A flow passage network including a flow passage in which a mother vessel having a radius of 60$_0$ and a first branch and a second branch bifurcated from the mother vessel and having radiuses of 60$_1$ and 60$_2$, respectively,
   wherein a diameter 60$_0$ of the mother vessel is 1, and a bifurcation angle 74$_1$ of the first branch is a predetermined value,
   a diameter $D^1$ of the first branch is selected such that:

$$\cos\theta_1 = \frac{a_0^4 + a_1^4 - (a_0^3 - a_1^3)^{4/3}}{2a_0^2 a_1^2},$$

a diameter $D_2$ of the second branch is selected such that: $D_0{}^3 = D_1{}^3 + D_2{}^3$
   a bifurcation angle 74$_2$ of the second branch is selected such that:

$$\cos\theta_2 = \frac{a_0^4 - (a_0^3 - a_2^3)^{4/3} + a_2^4}{2a_0^2 a_2^2}.$$

2. The flow passage network of claim 1, wherein the branches are symmetric bifurcations having the same diameter.

3. The flow passage network of claim 2, wherein the branches have a bifurcation angle range of 37.5° ±2° with respect to the mother vessel, respectively.

4. The flow passage network of claim 2, wherein the diameters and lengths of the mother vessel and the branches decrease at a ratio of $2^{-1/3}$.

5. A flow passage network including a flow passage in which a mother vessel having a radius of 60$_0$ and a first branch and a second branch bifurcated from the mother vessel and having radiuses of 60$_1$ and 60$_2$, respectively, wherein the mother vessel has a diameter $D_o$, the first branch has a diameter $D_1$, and the second branch has a diameter $D_2$, the first branch is angled relative to the mother vessel by a bifurcation angle 74$_1$, the second branch is angled relative to the mother vessel by a bifurcation angle 74$_2$, and the values of $D_o, D_1, D_2$, 74$_1$, and 74$_2$ are selected by:

(a) setting the diameter $D_0$ of the mother vessel to 1 and setting a bifurcation angle 74$_1$ of the first branch to a predetermined value;
   (b) calculating the diameter $D_1$ of the first branch by substituting the diameter $D_0$ of the mother vessel and a bifurcation angle 74$_1$ of the first branch set in (a) into $$\cos\theta_1 = \frac{a_0^4 + a_1^4 - (a_0^3 - a_1^3)^{4/3}}{2a_0^2 a_1^2};$$

(c) calculating the diameter $D_2$ of the second branch by substituting the diameter $D_0$ of the mother vessel and the diameter $D_1$ of the first branch calculated in (b) into $D_0{}^3 = D_2{}^3$;
   (d) calculating a bifurcation angle 74$_2$ of the second branch by substituting the diameter $D_0$ of the mother vessel and the diameter $D_2$ of the second branch calculated in (c) into $$\cos\theta_2 = \frac{a_0^4 - (a_0^3 - a_2^3)^{4/3} + a_2^4}{2a_0^2 a_2^2};$$

and (d) checking whether the diameters $D_0$, $D_1$, and $D_2$ and the bifurcation angles 74$_1$, 74$_2$, and the sum of the bifurcation angles 74$_{1+2}$ have been calculated to have correct values by using $$\cos(\theta_{1+2}) = \frac{(a_1^3 + a_2^3)^{4/3} - a_1^4 - a_2^4}{2a_1^2 a_2^2}.$$

\* \* \* \* \*